US009486926B2

(12) United States Patent
Kawano (10) Patent No.: US 9,486,926 B2
(45) Date of Patent: Nov. 8, 2016

(54) SYSTEM AND METHOD FOR AUTOMATIC PICKING OF PRODUCTS IN A MATERIALS HANDLING FACILITY (75) Inventor: Yasushi Kawano, Chiba-ken (JP)

(73) Assignee: AMAZON TECHNOLOGIES, INC., Reno, NV (US)

(*) Notice: Subject to any disclaimer, the term of this patent is extended or adjusted under 35 U.S.C. 154(b) by 0 days.

(21) Appl. No.: 14/378,300

(22) PCT Filed: Feb. 21, 2012

(86) PCT No.: PCT/US2012/025958
§ 371 (c)(1),
(2), (4) Date: Aug. 12, 2014

(87) PCT Pub. No.: WO2013/126048
PCT Pub. Date: Aug. 29, 2013

(65) Prior Publication Data
US 2015/0057793 A1 Feb. 26, 2015

(51) Int. Cl.
B25J 15/08 (2006.01)
B65G 43/08 (2006.01)
(Continued)

(52) U.S. Cl.
CPC ............... *B25J 15/08* (2013.01); *B25J 15/06* (2013.01); *B65G 1/1373* (2013.01); *B65G 43/08* (2013.01); *G06Q 10/087* (2013.01); *G06Q 50/28* (2013.01);
(Continued)

(58) Field of Classification Search
CPC .... B25J 15/0616; B25J 9/1669; B25J 15/08; B25J 15/06; B65G 1/1373
See application file for complete search history.

(56) References Cited

U.S. PATENT DOCUMENTS 6,061,607 A * 5/2000 Bradley ............... B65G 1/1376
414/273
6,289,260 B1 * 9/2001 Bradley ............... B65G 1/1373
414/273
(Continued)

FOREIGN PATENT DOCUMENTS

JP 2010-264559 A 11/2010

OTHER PUBLICATIONS

Chinchuluun, "Machine Vision Based Citrus Yield Mapping System on a Continuous Canopy Shake and Catch Harvester," retrieved from the internet at URL:<http://ufdcimages.uflib.ufl.edu/UF/EO/02/12/09/00001/chinchuluun_r.pdf>, 2007, 78 pages.
(Continued)

Primary Examiner — Thomas Randazzo
(74) Attorney, Agent, or Firm — Seed IP Law Group LLP (57) ABSTRACT Systems and computer-implemented methods are provided for automatically picking up items or products in a materials handling facility. In one embodiment, a system includes a first sensor; a conveyor; a robotic hand including multiple digits, each digit having one or more suction cups attached thereto; a memory; and one or more processors, which are all coupled together. The memory includes program instructions executable by the one or more processors to implement a pick process component configured to: (i) receive sensed information of an item or product delivered on the conveyor from the first sensor; (ii) generate a pick plan comprising processor-executable instructions to control the robotic hand to pick up the item or product; and (iii) control the robotic hand to pick up the item or product from the conveyor by executing the generated pick plan, while selectively activating the one or more suction cups.

16 Claims, 7 Drawing Sheets (51) Int. Cl.
*G06Q 10/08* (2012.01)
*B65G 1/137* (2006.01)
*G06Q 50/28* (2012.01)
*B25J 9/16* (2006.01)
*B25J 15/00* (2006.01)
*B25J 15/06* (2006.01)

(52) U.S. Cl.
CPC ............. *B25J 9/1669* (2013.01); *B25J 9/1679* (2013.01); *B25J 15/0009* (2013.01); *B25J 15/0616* (2013.01)

(56) References Cited

U.S. PATENT DOCUMENTS

| | | | | |
|---|---|---|---|---|
| 7,313,464 B1 * | 12/2007 | Perreault | ................ | B25J 9/1666 318/568.1 |
| 7,957,583 B2 * | 6/2011 | Boca | ...................... | B25J 9/1697 345/419 |
| 8,091,782 B2 * | 1/2012 | Cato | .................... | G06Q 10/087 235/385 |
| 8,182,010 B2 * | 5/2012 | Lee | ...................... | B25J 15/0009 294/106 |
| 8,425,173 B2 * | 4/2013 | Lert | ....................... | B65G 1/045 414/279 |
| 8,494,672 B2 * | 7/2013 | Chirnomas | .......... | B65G 1/1373 700/215 |
| 8,788,095 B2 * | 7/2014 | Maehara | ................ | B25J 9/1612 700/258 |
| 9,041,508 B2 * | 5/2015 | Glickman | ............ | G06Q 10/087 200/61.61 |
| 9,050,719 B2 * | 6/2015 | Valpola | .................. | B25J 9/1694 |
| 9,092,698 B2 * | 7/2015 | Buehler | ................. | B25J 9/0087 |
| 2009/0306825 A1 * | 12/2009 | Li | .......................... | B25J 9/1669 700/261 |
| 2010/0292841 A1 * | 11/2010 | Wickham | ............... | B25J 9/1679 700/259 |
| 2012/0029685 A1 * | 2/2012 | Keller | ................. | G06Q 10/087 700/216 |

OTHER PUBLICATIONS

International Search Report dated May 31, 2012, for corresponding International Application No. PCT/US2012/025958, 1 page.
Japanese Office Action for Japanese Application No. 2014-557614 mailed Aug. 4, 2015, 5 pages.

* cited by examiner

SYSTEM AND METHOD FOR AUTOMATIC PICKING OF PRODUCTS IN A MATERIALS HANDLING FACILITY

BACKGROUND

Electronic marketplaces, such as those accessible via the Internet, may include a catalog of items or products available for purchase. These items may be offered as the basis for commerce (e.g., sale or trade). In one example, customers may utilize a web browser to visit a merchant's website, select an item for purchase from the catalog, and engage in a checkout process to finalize an order for the item. The merchant may operate a fulfillment network including various facilities in order to process such orders. For instance, the merchant may include a facility that prepares shipments of purchased items. A shipment carrier may acquire such shipments from the merchant and deliver the shipments to the respective purchasing customers.

The facilities operated by the merchant may include various fulfillment processes for fulfilling orders submitted by customers. These processes may operate on items to perform various tasks, such as preparing items for shipment. At one or more points in these processes, items must be physically picked up from one location, for example, from a conveyor belt, and placed onto another location, such as onto another conveyor belt or into a sorting bin or a shipment box. The present invention is directed to providing an automatic picking system and method for use in a materials handling facility, which are capable of reliably and adaptively picking up items of various types such as items having various shapes, sizes, hardness, etc.

While the system and method for picking products or items are described herein by way of example for several embodiments and illustrative drawings, those skilled in the art will recognize that the system and method for picking products or items are not limited to the embodiments or drawings described. It should be understood that the drawings and detailed description thereto are not intended to limit the system and method for picking items or products to the particular form disclosed, but on the contrary, the invention is to cover all modifications, equivalents and alternatives falling within the scope of the system and method for picking items or products as defined in the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
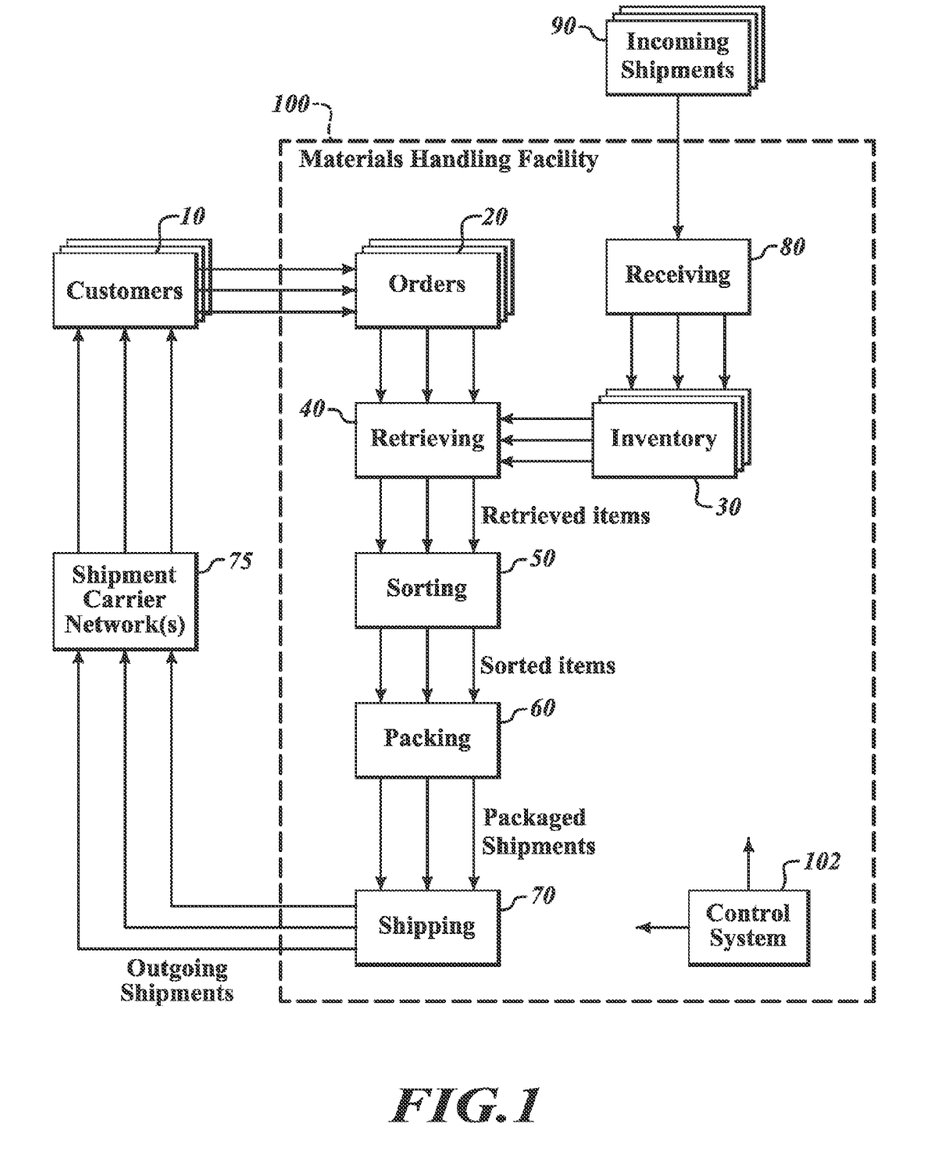
FIG. 1 illustrates a logical representation of the operations of a materials handling facility, according to some embodiments.

Various embodiments of a system and method for picking products in a materials handling facility are described. FIG. 1 illustrates a logical representation or view of the operation of an exemplary materials handling facility 100, in which the system and method for picking products according to various embodiments may be used. In various embodiments, a fulfillment network including multiple materials handling facilities (each of which may be configured in a manner similar to that of materials handling facility 100) may be responsible for fulfilling multiple orders, such as orders placed through an electronic commerce ("e-commerce") portal.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, FIG. 1 may illustrate an order fulfillment center of a product distributor, according to some embodiments. Multiple customers 10 may submit orders 20 to the product distributor through an ecommerce portal or other electronic marketplace, wherein each order 20 specifies one or more items from inventory 30 to be shipped to the customer that submitted the order. The inventory 30 includes incoming shipments 90 that have gone through receiving 80. To fulfill the customer orders 20, the one or more items specified in each order may be retrieved from inventory 30 (which may also be referred to as stock storage) in the materials handling facility, as indicated at 40. Retrieved items may be delivered or conveyed to one or more stations in the materials handling facility for sorting 50 into their respective orders, to packing 60, shipping 70, and finally to shipment carrier network(s) 75 to the customers 10. In various embodiments, the system and method for picking items or products according to the present invention may be used mainly in the sorting 50 stage, wherein items or products retrieved from the inventory 30 are received on one or more conveyor belts, from which the items or products may then be picked up to be placed onto another conveyor belt for further sorting, into a sorting bin, or into a shipment box.

Figure 2:
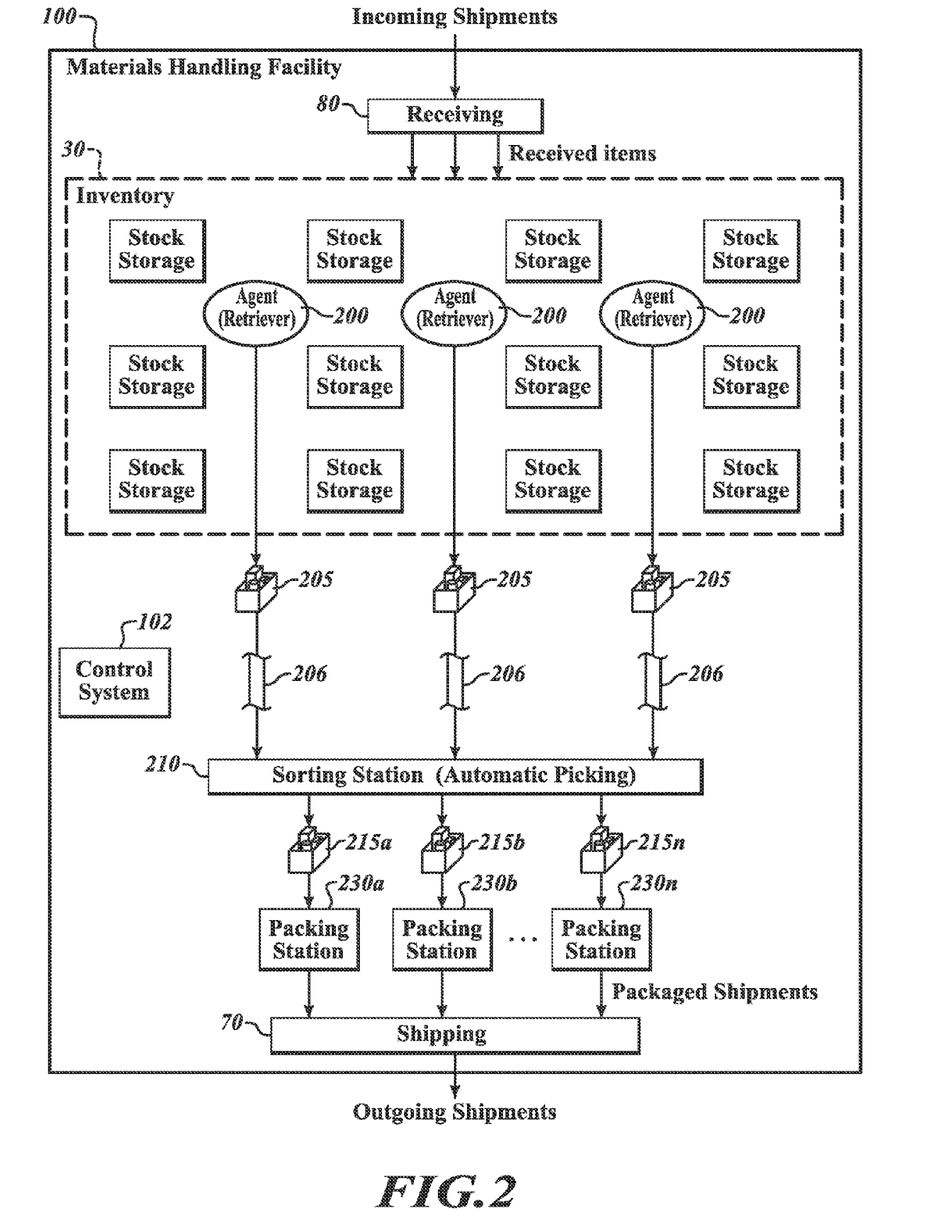
FIG. 2 illustrates an example physical layout for a materials handling facility, according to some embodiments.

FIG. 2 illustrates an exemplary physical layout of a materials handling facility, such as an order fulfillment facility or center, in which embodiments of the system and method for automatically picking products or items in a materials handling facility may be implemented. Requests (e.g., orders) for items from requestors may be divided among multiple agents (retrievers) 200, who then retrieve items from inventory storage 30. Retrieved units of items may be placed into receptacles 205 (e.g., totes or carts) for delivery. The orders may be subdivided among the agents 200; therefore, two or more of the agents 200 may retrieve items for one order and, also, each receptacle 205 may contain items for two or more orders. The retrieved items may be conveyed to a sorting station 210 or stations (there may be more than one sorting station 210) on one or more conveyance devices (e.g., conveyor belts) 206. For example, the agents 200 may "dump" the items contained in their receptacles 205 onto one or more conveyor belts 206, which extend to any of the sorting stations 210.

At the sorting station 210, the retrieved items conveyed on one or more conveyor devices are then sorted according to the orders 20 to thereby generate sorted groups of items 215a through 215n that respectively correspond to orders a through n. The sorted groups of items 215a through 215n are respectively delivered to packing stations 230a through 230n to be packaged for shipment, The packaged shipments are then processed at shipping 70 and forwarded to a shipment carrier for delivery to respective customers.

In each of the one or more sorting stations 210, retrieved items or products delivered on each of one or more conveyor devices need to be identified and selectively picked up, one or more times, to be eventually sorted into groups of items according to the orders. This process may involve selectively picking each item or product and placing it onto another conveyor belt for further sorting, into a sorting bin, or into a final shipment box. According to various embodiments, the method and system of automatic picking of items or products may be used at one or more locations in connection with one or more conveyor devices used at various stages in the sorting station(s) 210.

Figure 3:
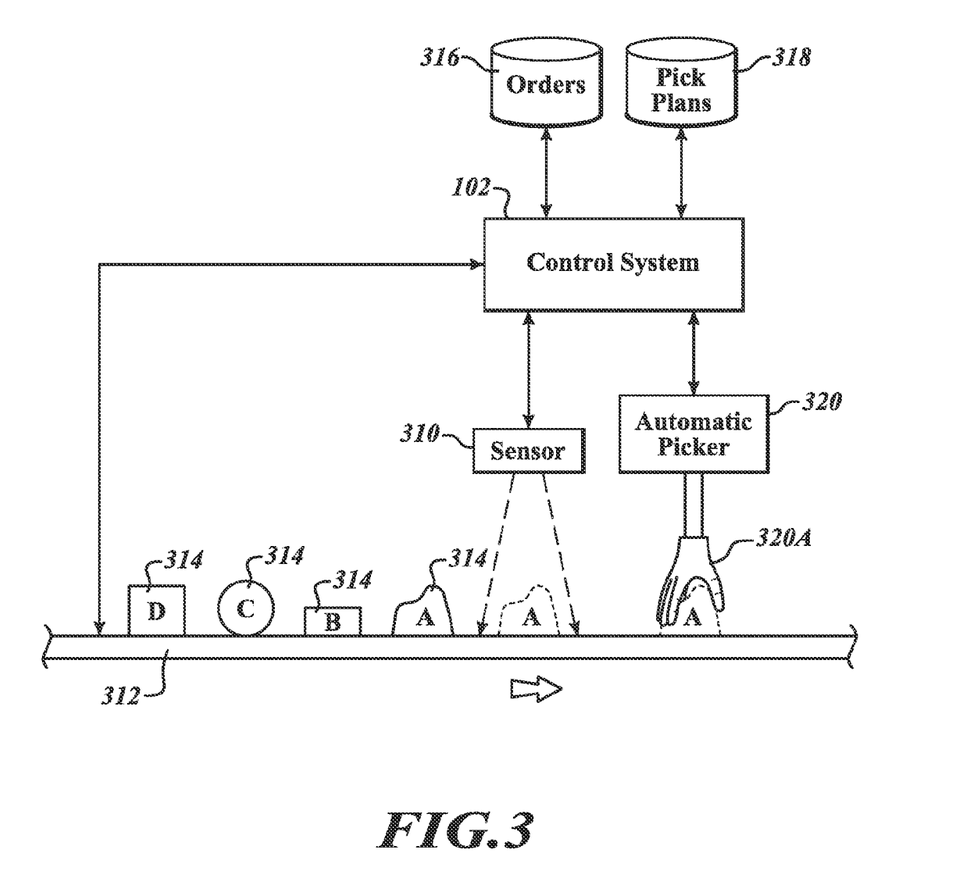
FIG. 3 illustrates an example system configuration including a pick control component, according to some embodiments.

FIG. 3 is a schematic view illustrating a system for automatically picking items or products in a materials handling facility according to some embodiments. The system includes a sensor 310, such as an image sensor (e.g., a 3D image sensor) and an ID sensor (e.g., a bar code reader, a Radio Frequency Identifier or RFID reader). The sensor 310 is arranged relative to a conveyor 312 (e.g., a conveyor belt, roller system, or other conveyance mechanism) to obtain sensor information of an item or product 314 delivered on the conveyor 312. FIG. 3 illustrates four different items or products 314, A, B, C and D, each having a different shape, size, hardness, etc. According to various embodiments, the system and method for automatically picking items or products are capable of reliably and adaptively picking up items or products of various types (shapes, sizes, hardness, etc.).

Figure 8:
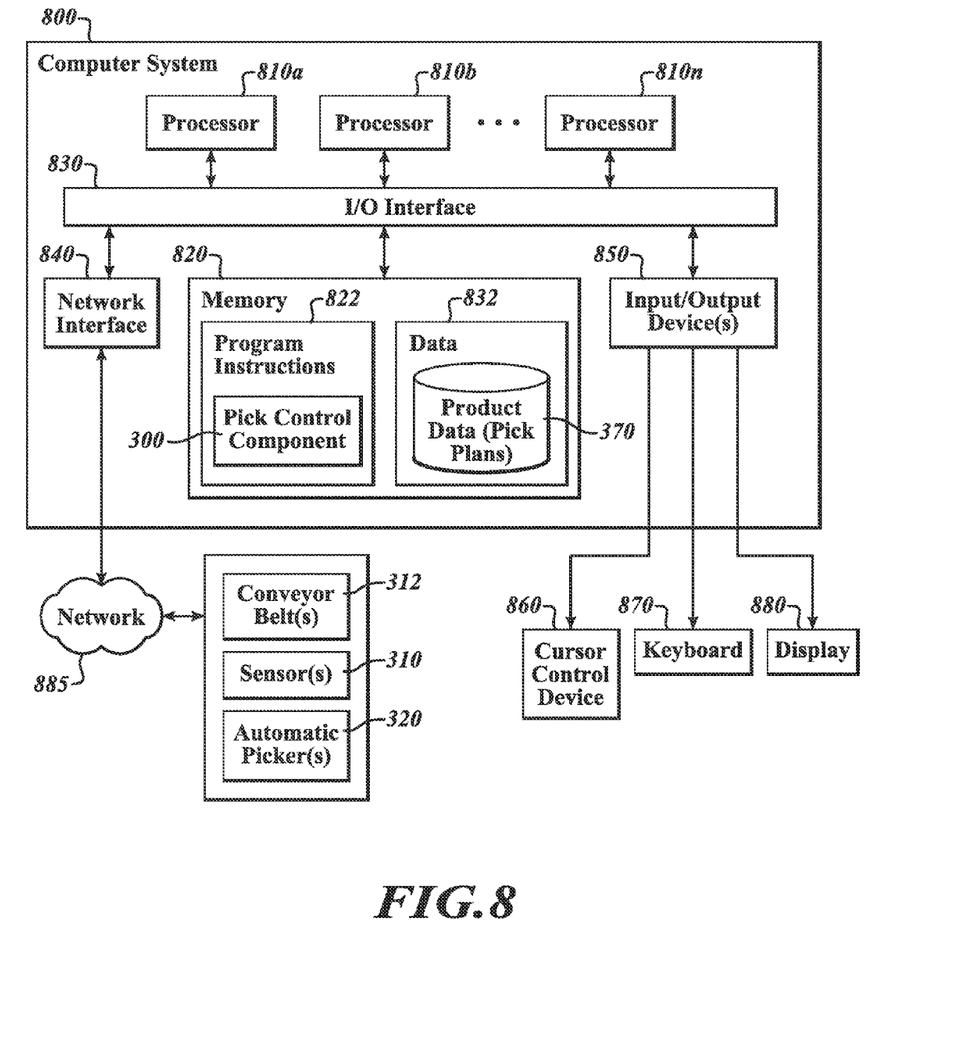
FIG. 8 is one example of a computer system suitable for implementing various elements of the system and method for automatic picking of products in a materials handling facility, according to some embodiments.

The sensed information obtained by the sensor 310 is sent to the control system 102, in which the sensed information of the product 314 "A" (in the illustrated embodiment), the ID of the product 314 "A," and the location of the product 314 "A" on the conveyor 312 are correlated with each other, and are referenced against the orders 10 in a memory 316. The control system 102 may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, RFID tags, etc.) on individual items or products 314 and/or individual sections (locations) of the conveyor 312, as will be more fully described below. An exemplary computer system that may be used in the control system 102 is illustrated in FIG. 8.

The ID of the product 314 may be obtained by any suitable ID sensor (e.g., a bar code reader, an RFID device) reading an ID tag (e.g., a bar code tag, an RFID tag, or some other scannable or readable mechanism, mark, or tag) attached to the product 314. For example, items may be marked or tagged with a bar code, Universal Product Code (UPC), Stock-Keeping Unit (SKU) code, serial number, and/or other designation (including proprietary designations) that may be used as item identifiers. The item IDs may identify items by type, and/or may identify individual items within a type of item. The ID sensor for this purpose may form or be part of the sensor 310, or may be provided separately from the sensor 310 when, for example, the sensor 310 is a 3D image sensor. The location of the product 314 on the conveyor 312 may also be obtained by attaching a location ID tag to each segment/section of the conveyor belt and reading the location ID tag with a suitable location ID sensor, which is included in the control system 102. Other means, such as a rotary encoder coupled to a shaft of the conveyor 312, may also be used to determine the location of the product 314, which is sensed by the sensor 310, relative to the conveyor 312. The item ID and the conveyor location ID may be communicated to the control system 102 via wired and/or wireless communications. The control system 102 correlates the sensed information of the product 314 "A," the ID of the product 314 "A," and the location of the product 314 "A" on the conveyor 312 with each other. The control system 102 then references the correlated information against the orders 10 in the memory 316 to make a decision to automatically pick up the product 314 "A" and place it onto another location for the purpose of sorting.

Once the control system 102 decides to automatically pick up the product 314 "A" to place it onto another specific location, the control system 102 controls an automatic picker 320 to pick up the item 314 "A."

Figure 5:
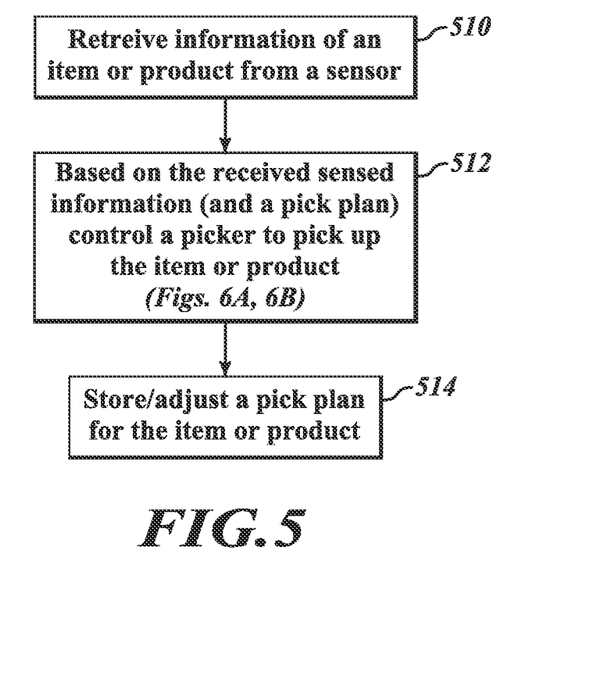
FIG. 5 is a flowchart of a sample automatic material picking process.

FIG. 5 is a flow chart of one method of automatically picking up an item or product according to some embodiments. In step 510, the sensed information of the item or product 314 "A" is received from the sensor 310. In step 512, based on the received sensed information, the control system 102 controls the automatic picker 320 to pick up the item or product 314 "A" and move it to another location. Additionally, the control system 102 may retrieve a defined pick plan stored in a memory 318 (FIG. 3) that corresponds to the identified item or product 314 "A" to be picked up, and may control the automatic picker 320 at least in part based on the retrieved pick plan. A pick plan includes processor-executable instructions to direct the automatic picker 320 to pick up the item or product 314 "A" based on determined characteristics of the item or product 314 "A", such as its dimensions (sizes, shapes), hardness/softness, texture, etc., which may affect how the item or product 314 "A" should be picked up by the automatic picker 320. In step 514, the method finally stores/adjusts a pick plan for the item or product 314 "A" in the memory 318.

Figure 6A:
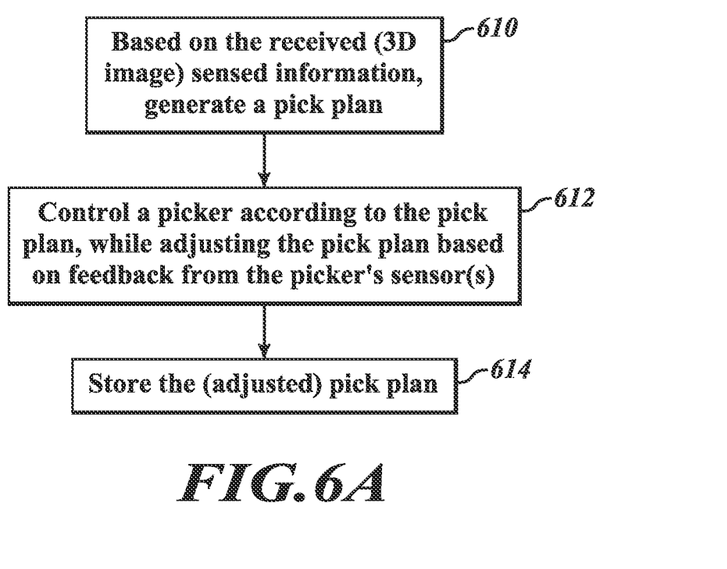
FIGS. 6A and 6B are flowcharts of example methods for controlling an automatic picker in an automatic material picking process.

For example, referring to FIG. 6A, if no pick plan for the item or product 314 "A" was previously stored in the memory 318, the control system 102 generates a pick plan based solely on the sensed information received from the sensor 310, such as a 3D image sensor. (Step 610). For example, the sensed information includes dimensions (sizes, shapes) of the item or product 314 "A" and based on the sensed information the control system 102 generates a pick plan. The control system 102 then controls the automatic picker 320 according to the generated pick plan, while perhaps adjusting the pick plan based on feedback information received from sensor(s) provided on the picker itself, as will be more fully described below. (Step 612). The control system 102 finally stores the (adjusted) pick plan in the memory 318 for later use when the same type of item or product 314 is again delivered on the conveyor 312 to be picked up by the automatic picker 320. (Step 614).

Figure 6B:
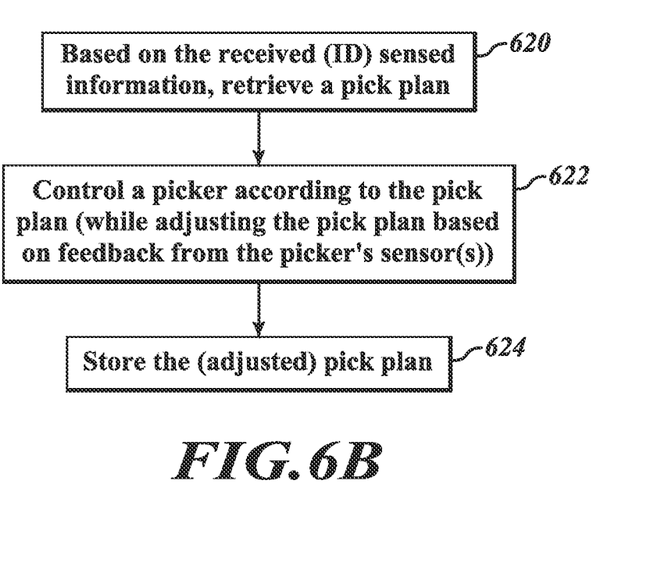

As another example, referring to FIG. 6B, if a pick plan for the item or product 314 "A" to be picked up is in the memory 318, the control system 302 retrieves the pick plan from the memory 318 based on the sensed ID information of the product 314 "A." (Step 620). The control system 102 then controls the automatic picker 320 according to the retrieved pick plan, while perhaps adjusting the pick plan based on feedback information received from the picker's sensor(s), to be described below. (Step 622). The control system 102 finally stores the (adjusted) pick plan in the memory 318 for later use when the same type of item or product 314 is again delivered on the conveyor 312 to be picked up by the automatic picker 320. (Step 624).

Figure 4A:
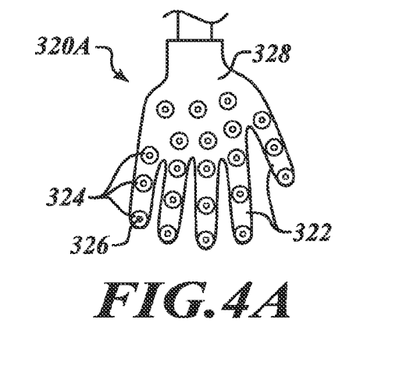
FIGS. 4A-4E illustrate four example configurations of an automatic picker according to some embodiments.
Figure 4B:
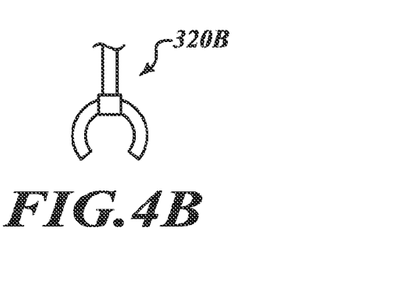

FIGS. 4A-4B show examples of automatic pickers 320 that may be used according to various embodiments. FIG. 4A shows a first example of a picker, which is a robotic hand 320A including multiple digits 322 that are each articulated and individually controllable, wherein each articulation is separately controllable. Various robotic hands and their control systems are available and a suitable control system for a robotic hand may be incorporated into the control system 102 of the pick control component according to various embodiments. Thus, the control system 102 may selectively control each articulation of each digit of a robotic hand 320A to hold (grab) the item or product 314 "A" according to its determined characteristics, such as its dimensions (sizes, shapes) and/or according to a defined pick plan for the item or product 314 "A." Each digit 322 of the robotic hand 320A includes one or more suction cups 324 each preferably coupled to a pressure sensor 326 (or touch sensor). The suction cups 324 may be additionally provided in a palm portion 328 of the robotic hand 320A. All of the suction cups are coupled to a vacuum generator (not shown) and can be selectively activated by the control system 102 to reliably hold a product or item 314. The pressure sensors 326 are configured to measure pressure applied thereto and send measured pressure values to the control system 102 via wired or wireless communications.

The robotic hand's pressure sensors 326 may be used to provide feedback information to the control system 102 to adjust or supplement the pick plan to control the robotic hand 320A to more reliably and adaptively hold the item or product 314 "A." Specifically, based on a pressure value measured by the pressure sensor 326 and sent to the control system 102, the control system 102 may activate the suction cup 324 associated with that pressure sensor 326. For example, when the pressure value measured by the pressure sensor 326 indicates that the suction cup 324 has contacted a surface of the product or item 314 "A," the control system 102 may activate the associated suction cup 324 to secure the suction cup 324 to the surface. Once the product 314 "A" has been picked up and moved to another specific location, the control system 102 then deactivates the suction cup(s) 324 to release the item or product 314 "A." The timings at which to activate/deactivate which of the suction cups of the robotic hand 320A may be part of the defined pick plan for picking up the item or product 314 "A," which may then be adjusted based on which of the suction cups 324 are actually activated at which actual timings according to the feedback information provided by the pressure sensors 326 of the robotic hand 320A.

FIG. 4B shows a second example of a picker, which is in the form of a so-called magic hand 320B including two digits that can be controlled to be "closed" to hold the item or product 314 or "opened" to release the same. Various magic-hands and their control systems are available and a suitable control system for a magic hand may be incorporated into the control system 102 of the pick control component according to various embodiments. A pick plan for controlling the magic hand 320B includes processor-executable instructions to control how much (far) to move the two digits closer together at what speed. As with the case of the robotic hand 320A described above, the magic hand 320 may also include sensors, such as pressure sensors or touch sensors, to provide accurate feedback information to the control system 102 as to the appropriateness of defined movement of the digits of the magic hand 320B. Based on the feedback information, the original pick plan may be adjusted and redefined.

Figure 4C:
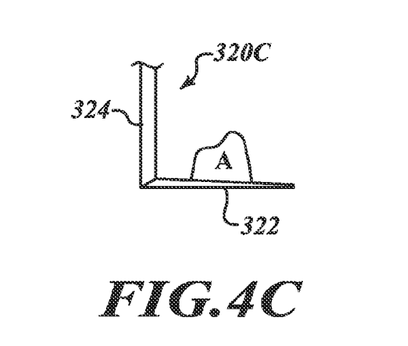

FIG. 4C shows a third example of a picker, which is a scooper-type picker 320C including a plate 322 to be inserted underneath the item or product 314 "A" to be picked up, to thereby scoop up the item or product 314 "A" in connection with movement of a generally vertical support 324. The vertical support 324 and the plate 322 meet generally perpendicular to each other. Various scooper-type pickers and their control systems are available and a suitable control system for a scooper-type picker may be incorporated into the control system 102 of the pick control component according to various embodiments. The scooper-type picker 320C is capable of and suited for picking up various types of products or items regardless of their shapes and their hardness/softness, and therefore may be suited for picking up relatively fragile items or products.

Figure 4D:
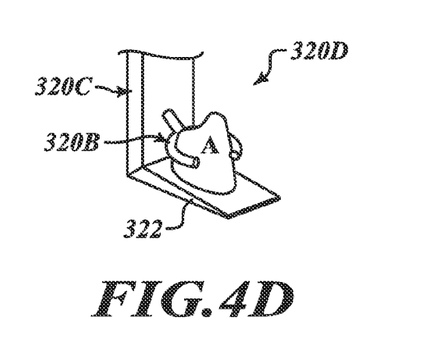

FIG. 4D shows a fourth example of a picker 320D, which is a combination of the scooper-type picker 320C and the magic hand 320B. This picker may be suited to more securely hold the item or product 314 "A" with the magic hand 320B so as to prevent it from shifting on or dropping from the plate 322 of the scooper-type picker 320C. To this end, a pick plan for controlling the picker 320D includes processor-executable instructions to control movement of both the scooper-type picker 320C and the magic hand 320B in a coordinated manner.

Figure 4E:
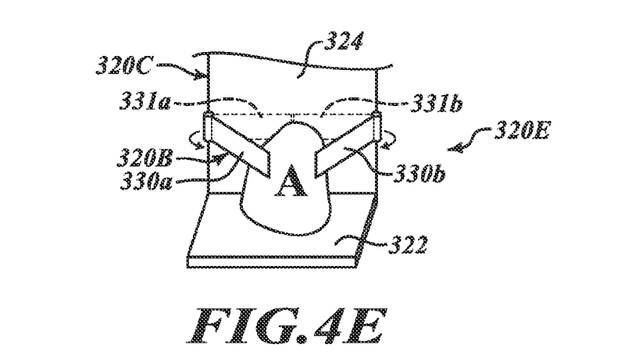

FIG. 4E shows a fifth example of a picker 320E, which is also a combination of the scooper-type picker 320C and the magic hand 320B, wherein the two are integrally formed. In the illustrated example, two digits 330a and 330b of the magic hand 320E are pivotally coupled to two edges of the vertical support 324. The digits 330a and 330b may be normally "folded" behind the vertical support 324, as shown in broken lines 331a, 331b, but may be activated to rotate out to hold (bind) the item or product 314 "A" on the plate 322 of the scooper-type picker 320C, via a suitable activation mechanism and control.

Figure 7:
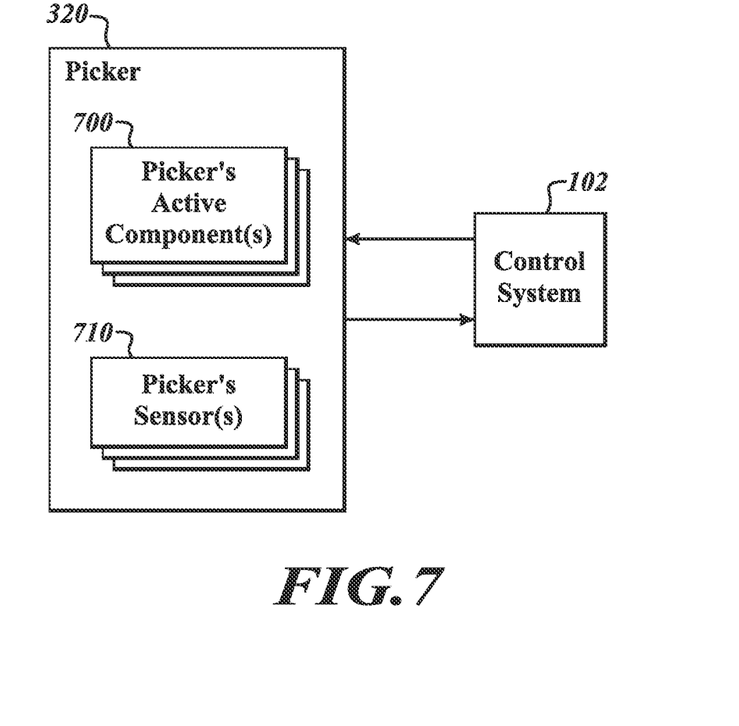
FIG. 7 illustrates feedback control of an automatic picker by a control system according to some embodiments.

FIG. 7 schematically illustrates interaction between the automatic picker 320 and the control system 102 to control the automatic picker 320 based on feedback information received from sensors provided on the automatic picker 320. Feedback information is provided by one or more sensors (e.g., pressure sensors, touch sensors) 710 coupled with the automatic picker 320 and sent to the control system 102 via wired or wireless communications. The feedback information may indicate various characteristics of the actual relationship (e.g., interaction) between the automatic picker 320 and the item or product 314 to be picked up, such as a pressure applied to the pressure sensor by a surface of the item or product 314 to be picked up, or a touch (contact) between the touch sensor and a surface of the item or product 314. Other examples of such sensors may include an infrared sensor and a laser sensor. The control system 102, upon receiving the feedback information from the sensor(s) 710, controls one or more of the active components of the automatic picker 320, such as the digits and each articulation (joint) of the digits of the robotic hand 320A or the magic hand 320B or the vertical support 324 of the scooper-type picker 320C, via wired and/or wireless communications.

Returning to FIG. 3, in addition to having the control system 102 generate (and adjust) a pick plan for each type of item or product, the system for automatic picking of products according to various embodiments may be configured to allow a user to manually or semi-manually input pick plans for certain (e.g., frequently processed) items or products and save them in the memory 318. Such manual or semi-manual construction and entry of pick plans are enabled by suitable input/output devices provided in the computer system 800 to be described in FIG. 8 below.

Various embodiments of the system and method for automatically picking products or items in a materials handling facility, as described herein, may be executed on one or more computer systems, which may interact with various other devices. Note that any component, action, or functionality described above with respect to FIGS. 1-7 may be implemented via one or more computer systems configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interlace 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 implementing pick control component 300 are shown stored within program instructions 822. Additionally, data 832 of memory 820 may store any of the information or data structures described above, such as product data 370 including pick plans for picking up various products or items. In some embodiments, program instructions and/or data may be received, sent or stored upon different types of computer-accessible media or on similar media separate from system memory 820 or computer system 800. While computer system 800 is described as implementing the functionality of process control component 300, any of the components or systems illustrated above may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. in some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O 5 interface 830, such as an interface to system memory 820, may be incorporated directly into processor 810.

Network interface 840 may be configured to allow data to be exchanged between computer system 800 and other devices (e.g., any other component of the Figures described above) attached to a network 885 (e.g., any element of FIG. 3) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822 configured to implement any element or action described above. In one embodiment, the program instructions may implement the methods described above, such as the method illustrated by FIGS. 5, 6A and 6B. In other embodiments, different elements and data may be included. Note that data 832 may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
    a first sensor;
    a conveyor;
    a robotic hand including multiple digits, each digit having one or more suction cups attached thereto, and at least one of the suction cups including a pressure sensor;
    a memory; and
    one or more processors coupled to the first sensor, the conveyor, the robotic hand and the memory, wherein the memory comprises program instructions executable by the one or more processors to implement a pick process component configured to:
    (a) receive sensed information of an item or product delivered on the conveyor from the first sensor, the sensed information including one or more of a variable shape, variable size, variable hardness and variable texture of the item or product;
    (b) based on the received sensed information of the item or product, control the robotic hand to pick up the item or product from the conveyor by selectively activing the one or more suction cups based on one or more pressure values detected by and received from corresponding one or more of the pressure sensors, respectively, which are included in the one or more suction cups, the pressure value being indicative of a pressure applied to the pressure sensor by the item or product; and
    (c) store a pick plan comprising processor-executable instructions to control the robotic hand to pick up the item or product in the memory, the pick plan being generated based on the received sensed information of the item or product.

2. The system of claim 1, wherein (b) further includes: (b-1) based on the received sensed information of the item or product, generate a pick plan comprising processor-executable instructions to control the robotic hand to pick up the item or product, and (b-2) execute the generated pick plan.

3. The system of claim 1, wherein the robotic hand further includes one or more suction cups attached to a palm portion of the robotic hand, each suction cup including a pressure sensor configured to detect a pressure applied thereto by the item or product and to send a detected pressure value to the pick process component.

4. The system of claim 1, wherein the first sensor is a 3D image sensor and the received sensed information is 3D image information of the item or product, and the pick process component is configured, in (b), to control the robotic hand to pick up the item or product based on the received 3D image information of the item or product.

5. The system of claim 1, wherein (b) further includes: (b-1) based on the received sensed information of the item or product, retrieve a pick plan corresponding to the item or product from the memory, and (b-2) control the robotic hand to pick up the item or product both based on the received sensed information of the item or product and according to the retrieved pick plan.

6. The system of claim 5, wherein (b) further include: (b-3) adjust the retrieved pick plan based on the control of the robotic hand performed in (b-2), and (c) includes storing the adjusted pick plan in the memory.

7. A system, comprising:
    a first sensor;
    a conveyor;
    a robotic hand including multiple digits, each digit having one or more suction cups attached thereto, and at least one of the suction cups including a second sensor;
    a memory; and
    one or more processors coupled to the first sensor, the conveyor, the robotic hand and the memory, wherein the memory comprises program instructions executable by the one or more processors to implement a pick process component configured to:

(a) receive sensed information of an item or product delivered on the conveyor from the first sensor, the sensed information including one or more of a variable shape, variable size, variable hardness and variable texture of the item or product;

(b) generate a pick plan comprising processor-executable instructions to control the robotic hand to pick up the item or product, the pick plan being based on the received sensed information of the item or product; and (c) control the robotic hand to pick up the item or product from the conveyor by executing the generated pick plan, while selectively activating the one or more suction cups based on one or more measurement values detected by and received from corresponding one or more of the second sensors, respectively, which are coupled to the one or more suction cups, wherein the second sensor is configured to detect a measurement value indicative of a relationship between the second sensor and the item or product to be picked up and to send a detected measurement value to the pick process component.

8. The system of claim 7, wherein the second sensor is a pressure sensor.

9. The system of claim 7, wherein the robotic hand further includes one or more suction cups attached to a palm of the robotic hand, each suction cup including a second sensor configured to detect a measurement value indicative of a relationship between the second sensor and the item or product and to send a detected measurement value to the pick process component.

10. The system of claim 7, wherein the first sensor is a 3D image sensor and the received sensed information is 3D image information, and the pick process component is configured, in (b), to generate a pick plan to control the robotic hand to pick up the item or product based on the received 3D image information of the item or product.

11. A computer-implemented method, comprising:

(a) receiving sensed information of an item or product delivered on a conveyor from a first sensor located relative to the conveyor, the sensed information including one or more of a variable shape, variable size, variable hardness and variable texture of the item or product;

(b) based on the received sensed information of the item or product, generating a pick plan comprising computer-executable instructions to control a robotic hand to pick up the item or product, wherein the robotic hand includes multiple digits, each digit having one or more suction cups attached thereto, and at least one of the suction cups including a second sensor configured to detect a measurement value indicative of a relationship between the second sensor and the item or product to be picked up; and (c) controlling the robotic hand by executing the generated pick plan and by selectively activating the one or more suction cups based on one or more measurement values detected by corresponding one or more of the second sensors, respectively, which are coupled to the one or more suction cups.

12. The computer-implemented method of claim 11, wherein generating the pick plan to pick up the item or product in (b) comprises retrieving a pick plan corresponding to the item or product from a memory based on the received sensed information of the item or product.

13. The computer-implemented method of claim 11, further comprising adjusting the pick plan based on the control of the robotic hand performed in (c).

14. The computer-implemented method of claim 11, wherein the second sensor is a pressure sensor.

15. The computer-implemented method of claim 11, further comprising adjusting the generated pick plan based on the control of the robotic hand performed in (c) including control of selective activation of the one or more suction cups based on one or more measurement values detected by corresponding one or more of the second sensors.

16. The computer-implemented method of claim 11, further comprising storing the pick plan in a memory for later use.

* * * * *